United States Patent [19]

Maus et al.

[11] Patent Number: 4,967,617
[45] Date of Patent: Nov. 6, 1990

[54] COMPOSITE SHAFT WITH INTEGRAL DRIVE ELEMENTS

[75] Inventors: Wolfgang Maus; Helmut Swars, both of Bergisch Gladbach, Fed. Rep. of Germany

[73] Assignee: Emitec Gesellschaft fur Emissionstechnologie mbH, Lohmar, Fed. Rep. of Germany

[21] Appl. No.: 295,302

[22] Filed: Jan. 10, 1989

[30] Foreign Application Priority Data

Jan. 14, 1988 [DE] Fed. Rep. of Germany ....... 3800914

[51] Int. Cl.⁵ .............................................. F16H 55/00
[52] U.S. Cl. ....................................... 74/432; 74/567; 403/277
[58] Field of Search ................... 74/567, 432; 29/447, 29/507, 508, 523; 403/273, 277, 284, 285

[56] References Cited

U.S. PATENT DOCUMENTS

| 1,409,204 | 3/1922 | Turner | 74/432 |
| 3,577,799 | 5/1971 | Harvey | 74/567 |
| 4,638,683 | 1/1987 | Ogawa et al. | 74/567 |
| 4,660,269 | 4/1987 | Suzuki | 29/523 |

FOREIGN PATENT DOCUMENTS

| 2069 | 2/1899 | Denmark | 403/277 |
| 0170378 | 2/1986 | European Pat. Off. | |
| 0257175 | 3/1988 | European Pat. Off. | |
| 0265663 | 5/1988 | European Pat. Off. | |
| 303357 | 9/1952 | Fed. Rep. of Germany | |
| 443480 | 11/1952 | Fed. Rep. of Germany | |
| 2922509 | 12/1980 | Fed. Rep. of Germany | |
| 3346056 | 7/1984 | Fed. Rep. of Germany | |
| 3530600 | 3/1987 | Fed. Rep. of Germany | |
| 3536296 | 3/1987 | Fed. Rep. of Germany | 74/567 |
| 8713285 | 10/1987 | Fed. Rep. of Germany | |
| 3633435 | 4/1988 | Fed. Rep. of Germany | |
| 3717516 | 12/1988 | Fed. Rep. of Germany | |
| 59-176404A | 10/1984 | Japan | |
| 168615 | 9/1959 | Sweden | 29/447 |
| 2050207 | 1/1981 | United Kingdom | |
| 2164420 | 3/1986 | United Kingdom | |

Primary Examiner—James R. Brittain
Attorney, Agent, or Firm—Toren, McGeady & Associates

[57] ABSTRACT

A hollow shaft composed of individual tube portions and provided with cams and end pieces, the individual tube portions preferably being interconnected by plastic expansion of the inner elements and elastic expansion of the outer elements. It is also possible to achieve a connection by shrinking the outer elements onto the inner ones by soldering or welding. Sleeves interconnecting the drive elements are designed to be integral with them and form part of the hollow shaft so that considerable weight savings are achieved by avoiding doubled regions where parts are slid onto each other. The design is particularly suitable for connecting parts with distinctly different elastic properties such as steel tubes and malleable cast iron drive elements.

7 Claims, 1 Drawing Sheet

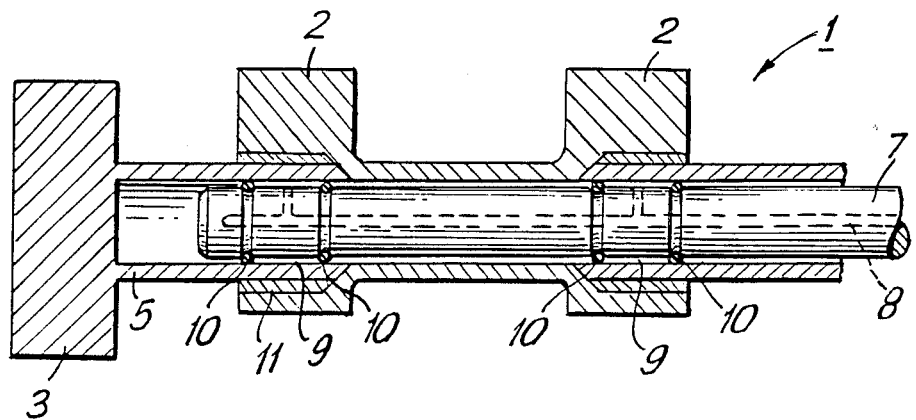

COMPOSITE SHAFT WITH INTEGRAL DRIVE ELEMENTS

BACKGROUND OF THE INVENTION

The present invention relates to a driveshaft having drive elements attached to it. In EP-A-No. 0 213 529, there is proposed a process for attaching drive elements such as cams, gears or bearing bushes on a hollow shaft which consists of a commercial tube. The drive elements are slid onto the tube and attached to it by expanding the tube portions underneath, with the material of the tube itself being deformed plastically whereas that of the drive elements is deformed only elastically so that due to the spring-back of the latter a firm fit on the shaft is achieved. Furthermore, in unpublished German Applications No. P 36 33 435.9 and P 37 17 516.5 there are specified dimensioning rules according to which, as a function of the material properties of the tube and drive elements, and especially their modulus of elasticity and yield point, the geometric conditions, e.g. the inner and outer tube diameter have to be determined in order to achieve a non-rotating, force-locking connection between the parts. It has been found that if the invention in particular is applied to camshafts of motor vehicle engines the component dimensions required by these dimensioning rules, for design or weight reasons, cannot always be made available. Furthermore, with some applications, especially if the camshafts are used for motor vehicle engines, it is necessary for the described process also to be capable of connecting drive elements of a brittle and less elastic material, e.g. malleable cast iron, to shafts. In utility model application No. G 87 13 285.0, also unpublished, there is proposed that such drive elements should have axially different material properties in that only parts of them are subjected to hardening processes and expansion is carried out only in those regions of the continuous hollow shaft positioned inside the ductile regions of the drive elements. This proposal is less suitable for fixing those drive elements which overall consist of a material with little elasticity.

SUMMARY OF THE INVENTION

It is thus an object of the present invention to provide a driveshaft of the described type which consists of individual axial portions joined together and having different material properties. In particular, it should be possible to produce drive elements of a brittle, low-elasticity material which are less suitable for being joined through elastic spring-back onto a plastically deformed shaft member.

Pursuant to this object, and others which will become apparent hereafter, one aspect of the present invention resides in a hollow shaft made up of individual first tubular portions connected to second tubular portions which are integral with drive elements. Part of the hollow shaft is replaced so to speak by parts of the drive elements themselves so that, on the one hand two or more drive elements may be joined to form one unit (as a result of which the number of connecting regions to be produced by expansion is reduced), but on the other hand the additional weight of the connecting sleeves between the joined drive elements is saved.

In further embodiments the first and second portions are connected by plastic expansion of one of the first and second portions into the other of the portions, which are elastically deformable, or by shrinking one of the portions onto the other. The design proposed here is not only suitable for the process described in the above publications for fixing the inner part of the connection by plastic expansion and the outer part by elastic expansion, but it is also suitable for processes in which the drive elements are slid onto the hollow shaft in a heated condition, with the shrinkage stresses occurring during the cooling process ensuring a sufficiently firm fit on the shaft.

In yet another embodiment an intermediate layer of a material with a high modulus of elasticity is arranged between overlapping parts of the first and second portions. This ensures a sufficiently firm connection even when joining an inner ductile part with an outer part with a low elasticity. When selecting the material it is necessary to take into account the dimensioning rules referred to above and of course any other requirements to be met by the component.

In a further alternative for connecting the first and second portions of the hollow shaft, material locking, i.e. high-temperature soldering, is used.

In still another embodiment where the first portions and/or the second portions have material and surface conditions which meet requirements of a bearing region, it is possible to eliminate bearing bushes as used in friction or roller bearings; this function being transferred to suitable parts of the shaft itself.

BRIEF DESCRIPTION OF THE DRAWING

An embodiment of the invention is illustrated in the drawing in the form of an axial longitudinal section.

DETAILED DESCRIPTION OF THE PREFERRED EMBODIMENT

As seen in the drawing camshaft 1, used as an example, consists of first portions 5 in the form of pieces of a commercial precision steel tube and second portions 2,3 which may have the form of double cams 2 connected by a sleeve which is integral with them and whose inner diameter preferably corresponds to that of the tube piece 5 and whose wall thickness is such that taking into account the different material properties, the entire shaft 1 along its whole length has the same strength. The end pieces 3 may be designed in a similar way and connected to the tube pieces 5 in order to take full advantage of the weight saving possibilities by eliminating unnecessary doubling of parts. The cams 2 and the end pieces 3 may have material properties as required to fulfill their function in an optimum way, e.g. they may be produced of a relatively brittle material such as malleable cast iron. In such a case it is recommended to provide intermediate layers 11 made of a material with a high modulus of elasticity to ensure a sufficiently firm fit of the outer part 2 on the inner part 5 without subjecting the former to impermissibly high tensile stresses. If the right material is chosen, the outer surfaces of the tube pieces 5 and/or of the cams 2 and the end pieces 3 may be machined in such a way that they can be used directly as parts in friction or roller bearings. The various parts are preferably connected in that a hydraulic pressure probe 7 is introduced into the interior of the hollow shaft, and in the interior of the probe 7, via a channel 8 provided with branches, a pressure fluid may be supplied to regions 9 to be expanded which are axially limited by annular seals 10. The regions of the hollow shaft 1 in question are deformed plastically, whereas the cams 2 and the end flange 3 (if necessary via the intermediate layer 11) are deformed only elastically so that they spring back after completion of the expansion process, thereby producing a firm, force-locking connection between the parts. The various parts may also be connected in a material-locking way in which case the part 11 so far referred to as an intermediate layer would be a soldered region for example.

While the invention has been illustrated and described as embodied in a composite shaft with integral drive elements, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention

What is claimed as new and desired to be protected by letters patent is set forth in the appended claims.

What is claimed is:

1. A hollow shaft comprising individual first tubular portions connected to second tubular portions which are integral with drive elements, said first tubular portions and said second tubular portions having end parts, said first tubular portions being inserted with at least one of the end parts into at least one of the end parts of said second tubular portions, the first tubular portions having a modulus of elasticity which is higher than that of said second tubular portions.

2. A hollow shaft according to claim 1, wherein the end parts of said first and said second tubular portions which are inserted into one another overlap, and further comprising an intermediate layer of a material having a modulus of elasticity higher than that of said second tubular portions, said intermediate layer being arranged between the overlapping end parts of said first and second tubular portions.

3. A hollow shaft according to claim 2, wherein a force or friction locking connection is provided between said first tubular portions and said intermediate layer.

4. A hollow shaft according to claim 3, wherein said intermediate layer is within said overlapping parts inside of a drive element.

5. A hollow shaft according to claim 1, wherein said first tubular portions are steel precision tubes.

6. A hollow shaft according to claim 1, wherein said second tubular portions are made of malleable cast iron.

7. A hollow shaft according to claim 1, wherein the end parts of said first tubular portions are inserted into said end parts of said tubular portions so that a force or friction locking connection is formed.

* * * * *